United States Patent [19]

Rieux et al.

[11] 3,865,705

[45] Feb. 11, 1975

[54] PROCESS FOR MODIFYING THE SURFACE CHARACTERISTICS OF CARBON SUBSTRATES AND COMPOSITE ARTICLES PRODUCED FROM THE TREATED SUBSTRATES

[75] Inventors: Jean-Philippe Rieux, Decines; Jean Lehureau, Lyon, both of France

[73] Assignee: Rhone-Progil, Paris, France

[22] Filed: Apr. 12, 1973

[21] Appl. No.: 350,521

[30] Foreign Application Priority Data
Apr. 21, 1972  France .............................. 72.14950

[52] U.S. Cl. ................................................ 204/130
[51] Int. Cl. ............................................. C01d 7/34
[58] Field of Search .................................... 204/130

[56] References Cited
UNITED STATES PATENTS

| | | | |
|---|---|---|---|
| 2,807,577 | 9/1957 | Antonsen | 204/130 |
| 3,323,869 | 6/1967 | Olstowski | 204/130 |
| 3,671,411 | 6/1972 | Ray et al. | 204/130 |
| 3,746,506 | 7/1973 | Aitken et al. | 204/130 |
| 3,759,805 | 9/1973 | Chapman et al. | 204/130 |

*Primary Examiner*—R. L. Andrews
*Attorney, Agent, or Firm*—Bacon & Thomas

[57] ABSTRACT

Disclosed is a method for modifying and improving the surface characteristics of a carbon substrate which comprises subjecting the carbon substrate to alternating treatment as an anode and a cathode by passage of current in an electrolytic cell wherein the carbon substrate acts as one electrode and there is provided a second electrode, both in an aqueous electrolyte solution. The modified carbon substrates impart improved mechanical properties to composite articles produced using same as reinforcing elements.

10 Claims, No Drawings

PROCESS FOR MODIFYING THE SURFACE CHARACTERISTICS OF CARBON SUBSTRATES AND COMPOSITE ARTICLES PRODUCED FROM THE TREATED SUBSTRATES

BACKGROUND OF THE INVENTION

The present invention relates to subjecting a carbon substrate, where the carbon is in either the graphitic or non-graphitic form, for example, carbon fibers, filaments, fibrils, films, ribbons, sheets, plates and the like, to a two-stage electrolytic treatment. The carbon substrate thus treated exhibits appreciably modified surface characteristics which render it ideally suited for the manufacture of composite reinforced products.

This invention also relates to composite reinforced articles comprised of a carbon substrate which has been subjected to the aforesaid two-stage electrolytic treatment, and which composite articles exhibit various improved physical properties such as enhanced mechanical strength. By the term "composite article" there is intended by heterogeneous assembly comprised of two or more components, at least one of which defines a continuous phase which is hereinafter designated as a "matrix" component, and at least one other component defining reinforcing means or reinforcement for the said composite assembly, the reinforcing means being contiguous and firmly bonded to the matrix component. For example, the respective components of the composite assemblies of the invention can be either coated, layered, stratified and/or laminated, randomly filled and the like, whereas the matrix of which is preferably a thermosetting synthetic resinous material and the reinforcing means or reinforcement can be fibrous, felt, or fabric in nature and of diverse origin, e.g., glass, carbon, synthetic fabric and the like. Exemplary of other composites or composite assemblies, there are mentioned metal-carbon, metal-fiber and the like. Also representative of such composites are those fabricated utilizing an adhesive and in which the adhesive defines the continuous phase or serves as the matrix therefor.

By way of background, in the prior art composites or composite assemblies it is known that the reinforcing means or reinforcement enhances such properties as tensile strength and/or bending strength, but that these properties nevertheless evidence values considerably lower than the theoretical value which is calculated on the basis of the actual strength of the reinforcing means and its proportion among the materials comprising the composite. This loss in such properties is moreover known to be especially due to the lack of adhesion between the matrix component and the reinforcing means comprising the composite. If, on the one hand, the inherent properties of the matrix, and on the other hand, those of the reinforcement play a considerable role in the transfer of force from one component to the other, the degree of interaction between the two components is also determinative. In an effort to improve upon the aforesaid degree of interaction, the prior art is replete with attempts to modify the physical properties of various composites by performing a variety of surface treatments upon the reinforcement or reinforcing means comprising the same, and which include various chemical, electrochemical, mechanical and other treatments. Unfortunately, the results which have been obtained to date can be deemed to be generally inadequate, otherwise deficient, and/or are not readily reproducible. A need therefore exists for improving the physical properties of composites to align these properties more closely to the theoretical.

SUMMARY OF THE INVENTION

Accordingly, a primary object of this invention is to provide an improved surface treatment for carbon reinforcing means intended for ultimate use in otherwise conventional composite assemblies.

Another object of this invention is to provide an improved composite assembly, the physical properties of which more closely conform to the theoretical.

Still another object of the invention is to provide a carbon substrate having enhanced surface characteristics such that it is eminently suitable for the fabrication of composites therefrom by reason of its great compatibility with and great adhesiveness to various matrix components.

In attaining these objects, one feature of this invention resides in subjecting a carbon substrate, for example, carbon fibers, filaments, fibrils, films, ribbons, sheets, plates, and the like, to a two-stage electrochemical treatment wherein the carbon substrate is first connected as an anode in an electrolytic cell containing an aqueous solution of electrolyte, a source of electrical current, either direct current or alternating current, is then applied to the electrolytic cell for a period of time, the carbon substrate is next coupled as a cathode in the same electrolyte and the source of electrical energy is again applied to the electrochemical cell. Advantageously, the second stage of treatment is accomplished by a mere reversal of current in the cell. Another feature of this invention resides in the fabrication of various composite assemblies utilizing the thus-treated carbon substrate as a reinforcing means therefor and which composites exhibit properties of tensile and/or bending strength, etc. which are superior to those conventionally attained and more closely conform to theoretical calculations.

Other objects, features and advantages of the invention will be apparent to those skilled in the art from the detailed description of the invention which follows.

DETAILED DESCRIPTION OF THE INVENTION

In carrying out the two-stage treatment process in accordance with the present invention, the apparatus necessary includes a conventional electrolysis vessel having two electrodes and an aqueous solution of an electrolyte contained in the vessel. One of the electrodes is made of a material which is chemically inert, while the other electrode is formed by the carbon substrate to be treated. In addition, there is included a current source, preferably a source of direct current, with a voltage stabilizer and a changeover switch. A source of periodically reversing current, particularly conventional alternating current, can also be employed in the process of the invention.

In the first stage of the process, the carbon substrate which is, for example, in the form of a bundle of fibers, is placed in the electrolytic cell and connected to the source of current so as to act as an anode. The other, inert electrode acts in the first stage as a cathode, and after the electrolytic cell has been operated for the prescribed period of time, the portion of the process defined as the second stage begins when the bundle of fibers initially acting as an anode is caused to exchange its function and act as a cathode, conveniently by a simple reversal of current. Practically speaking, the treatment can be carried out utilizing a direct current source either in a batchwise fashion employing a bundle of fibers of relatively short length, or it can be operated on a continuous basis by conveying a continuous bundle of fibers successively through a first electrolytic vessel where the fiber bundle acts as an anode, followed by a second vessel, which is electrically independent, where the continuous bundle of fibers acts as a cathode. On the other hand, when the treatment is carried out continuously using a source of alternating current, only one electrolytic vessel is employed, and obviously, no independent reversal of current is needed. By the proper selection of the chemical, physical and electrical parameters in the process, a significant modification of the surface characteristics of the fibers is achieved.

In either the batchwise or continuous effectuation of the process of the present invention, an aqueous electrolyte solution is employed. The electrolytic solution can be prepared using an acid compound, an alkaline or neutral salt or a basic compound. Typical examples of compounds which can be used to prepare the electrolyte include sodium chloride, caustic soda, sulfuric acid, and the like, or mixtures of these compounds. The electrolyte typically contains such compounds at a concentration within the range of about 10 to 500 grams per liter.

The current level and voltage are chosen so that the most efficient treatment of the surface of the carbon substrate is achieved. Typically, a current density of from about 0.005 to about 0.1 ampere per square decimeter is employed, although considerably higher values up to about 1 ampere per square centimeter may be employed for certain types of carbon, such as glassy carbon. When direct current is used, the duration of current flow in the first stage where the carbon substrate is coupled as an anode in the electrolytic cell typically ranges from about 1 to 10 minutes and will vary within this range depending upon the current density chosen. In the second stage of the treatment process where the carbon substrate is coupled as a cathode in the electrolytic cell, the duration of current flow is chosen between about 15 seconds and 10 minutes. When alternating current is employed, the duration of the current flow ranges between about 1 and 20 minutes.

When the carbon substrate, for example in the form of a bundle of fibers, is connected as an anode in the cell, the negative ions, by means of an oxidation action, effect a modification of the surface characteristics of the carbon. Upon the reversal of the current, when the carbon substrate is then coupled as the cathode of the electrolytic cell, there occurs a particularly effective removal of the residues of carbon which appear in powder form during the first stage of the treatment process. It is necessary to limit the times of oxidation in the first stage in order to prevent a too significant degradation of the carbon substrate, which would disadvantageously lead to a decrease in the mechanical properties thereof. On the other hand, in the second stage of the electrolytic process in which the surface of the carbon substrate is cleaned without being degraded, the duration of current flow is of less importance and need not be so carefully controlled to prevent overtreatment. Nevertheless, it has been observed that the most advantageous mechanical properties of the resulting composite articles manufactured with the treated carbon substrates are obtained with fibers which have undergone a treatment wherein the duration of current flow in both the first and second stage equal approximately three minutes and wherein the current density is approximately 0.01 ampere per square decimeter.

The composite reinforced articles which are produced using the treated carbon substrate of this invention are those well known in the art and include composites of organic and inorganic material containing reinforcing means in the form of laminated layers, encapsulated webs of fibers or continuous filaments, randomly distributed discrete particles in fiber, rod or similar shape and other known modifications. Most common, and therefore most preferred in this invention are composites comprising fibrous reinforcing elements distributed throughout a solid matrix of binder material, preferably a synthetic resinous binder material and most preferably a thermosettable synthetic resin. Exemplary of such preferred binder materials are phenol formaldehyde resins, urea formaldehyde resins, melamine formaldehyde resins, epoxy resins, polycarbonates, polyesters, polyurethanes and the like. Typically, the reinforcing fibers have a length from about 10 to 1,000 mm and a diameter of from about 0.001 to 0.003 mm, and are present in the composite in an amount ranging from about 10 to 80 % by weight. A particularly advantageous feature of the present invention resides in the fact that composites having a higher than usual fiber content can be prepared utilizing carbon fibers treated in accordance with the disclosed process.

In order to further illustrate the present invention and the advantages thereof, the following specific examples are given, it being understood that the same are intended to be merely illustrative and not in any way limitative.

EXAMPLE 1

In an electrolysis vessel containing an aqueous electrolyte solution having a concentration of 50 grams per liter of sodium chloride and 2.5 grams per liter of caustic soda, an iron electrode is connected in the position of a cathode and a bundle of carbon fibers having a high modulus (the fibers are approximately 1 centimeters long and have an average diameter of 0.0001 centimeters; the total weight of the bundle is 4.2 grams) is connected in the position of an anode. The distance between the electrodes is 50 millimeters. The apparatus is then connected to a DC voltage source having a potential difference of 4.3 volts and a direct current of 5 milliamperes per square decimeter current density is passed through the cell. The cell is allowed to operate for a period of one minute, and then the current is reversed so that the bundle of fibers becomes the cathode and the iron electrode becomes the anode. The same current is then passed through the cell in this configuration for an additional 15 seconds.

EXAMPLE 2

Utilizing the identical cell configuration as in Example 1 and following the same operating procedure of Example 1, the experiment is repeated except that the first stage of electrolysis lasts for a period of 1 minute and the second stage of electrolysis, after current reversal, is conducted for a period of 3 minutes.

EXAMPLE 3

Utilizing the identical cell configuration as in Example 1 and following the same operating procedure of Example 1, the experiment is repeated except that the first stage of electrolysis lasts for a period of three minutes and the second stage of electrolysis, after current reversal, is conducted for a period of 3 minutes.

The individual carbon fibers (monofilaments) treated in accordance with the foregoing examples are tested to determine their mechanical characteristics. To accomplish the same, it is necessary to test each fiber in an environment free from any mechanical contact which could interfere with the results of the respective measurements. To this end, each filament is affixed by means of wax droplets to a perforated paper ribbon with the longitudinal axis thereof being parallel to the long axis of the ribbon. The sides of the perforated ribbon are lastly cut and each sample thus obtained is secured in a tensile strength measuring traction apparatus.

In the Table I which follows there are reported the tensile strengths of the respective monofilaments, the tests being conducted at 20°C. and utilizing a linear extension rate of 0.05 centimeter per minute.

TABLE I

| Example | Tensile strength kg/mm$^2$ |
| --- | --- |
| 1 | 155 |
| 2 | 150 |
| 3 | 155 |
| untreated sample | 160 |
| sample treated with nitric acid | 50 |
| sample treated with formic acid | 150 |

It may be seen from the foregoing test results that the mechanical properties of the fibers treated in accordance with the present invention are not disadvantageously affected by the treatment. On the other hand, it is observed that chemical treatment of the fiber with nitric acid appreciably lowers the mechanical resistance thereof.

EXAMPLE 4

The electrolytic apparatus as described in Example 1 is again employed except that an electrolytic solution containing sulfuric acid (95%) at a concentration of 50 grams per liter is utilized. The first stage of electrolytic treatment is conducted for a period of 1½ minutes whereas the second stage following current reversal has a duration of 30 seconds.

EXAMPLE 5

In an electrolysis vessel containing an aqueous solution having a concentration of 50 grams per liter of sodium chloride and 5 grams per liter of caustic soda, a carbon electrode is connected in the position of a cathode and a bundle of high modulus carbon fibers (average length of 10 centimeters; average diameter of 0.0003 centimeters total weight of 4.2 grams) is connected as the anode of the electrolytic cell. The distance between the two electrodes is 50 millimeters. An alternating current with a frequency of 50 Hertz is then permitted to flow through the system under a potential difference of 4 volts and at an intensity of 1.30 amperes which corresponds to a current density of 0.06 amperes per square decimeter. The electrolytic cell thus constituted is permitted to operate for a period of 6 minutes, with the bundle of carbon fibers acting alternatively as an anode and then as a cathode throughout the period of operation.

EXAMPLE 6

Composite articles of synthetic resin reinforced with carbon fibers are prepared by combining the carbon fibers treated in accordance with Example 1 with an epoxy resin based upon diepoxide Bisphenol-A cured with nadic methyl anhydride in the presence of dimethylaminomethylphenol to form sheets of the composite material. Bending strength and shearing strength tests are then conducted utilizing these composites. The bending tests are carried out on test pieces measuring 100 × 12.5 × 1.3 millimeters employing a distance of 50 millimeters between supports. The shearing tests (i.e., these involve the measuring of bending strength where the supports employed are brought closer together; these tests are an indication of the failure of cohesion between matrix and fibers, which involves a shearing force) are carried out on test pieces measuring 25 × 12.5 × 1.3 millimeters utilizing a distance of 10 millimeters between supports. In both tests, the test machine was operated at a linear extension rate of 0.05 centimeters per minute at a temperature of 20°C.

The following series of composites, prepared as described above, are produced from carbon fibers which have undergone the electrochemical treatment utilizing the electrolysis system described in Example 1. The percentage content of the carbon fibers is indicated for each sample.

Composite A — made with untreated carbon fibers wherein the amount of fibers constitutes 70% by weight.

Composite B — made with carbon fibers which have been electrolytically treated for 3 minutes as an anode only. The proportion of fibers in the composite is 70% by weight.

Composite C — made with carbon fibers which have been electrolytically treated for 3 minutes in the position of an anode followed by an additional 3 minutes treatment in the position of a cathode. The proportion of fibers is 70% by weight.

Composite D — made with untreated carbon fibers wherein the amount of fibers constitutes 75% by weight.

Composite E — made with carbon fibers treated electrolytically for 3 minutes in the position of an anode only. The proportion of fibers is 75% by weight.

Composite F — made with carbon fibers electrolytically treated for 3 minutes in the position of an anode followed by further treatment for 3 minutes in the position of a cathode. The proportion of fibers is 75% by weight.

Composite G — made with carbon fibers electrolytically treated for 3 minutes in the position of an anode only. The proportion of fibers is 78% by weight.

Composite H — made with carbon fibers electrolytically treated for 3 minutes in the position of an anode followed by an additional treatment of 3 minutes in the position of a cathode. The proportion of fibers is 78% by weight.

Composite I — made with carbon fibers electrolytically treated for 3 minutes in the position of an anode only. The proportion of fibers is 80% by weight.

Composite J — made with carbon fibers electrolytically treated for a period of 3 minutes in the position of an anode followed by 3 minutes of treatment in a position of a cathode. The proportion of fibers in the composite is 80% by weight.

Composite K — made with carbon fibers treated electrolytically for a period of 3 minutes in the position of an anode only. The proportion of fibers is 82% by weight.

Composite L — made with carbon fibers electrolytically treated for 3 minutes in the position of an anode and then subsequently for an additional 3 minutes in the position of a cathode. The proportion of fibers constitutes 82% by weight.

The results are given in the following table.

TABLE II

| Composite | Treatment of Carbon Fiber | Percentage of Fibers By Weight | Bending Strength kg/mm² | Shearing Strength kg/mm² |
|---|---|---|---|---|
| A | Untreated | 70% | 58 | 2.4 |
| B | As an anode only | 70% | 86 | 6.1 |
| C | As an anode followed by a cathode | 70% | 92 | 7.5 |
| D | Untreated | 75% | Material macroscopically heterogenous. Amount of fibers too high. 70 | 2.5 |
| E | As an anode only | 75% | 86 | 7 |
| F | As an anode followed by a cathode | 75% | 100 | 8.5 |
| G | As an anode only | 78% | 88 | 8 |
| H | As an anode followed by a cathode | 78% | 102 | 9.2 |
| I | As an anode only | 80% | 90 | 8.3 |
| J | As an anode followed by a cathode | 80% | 103 | 9.5 |
| K | As an anode only | 82% | Amount of fibers too high; a portion of the fibers is ejected out of the mold. | |
| L | As an anode followed by a cathode | 82% | 103 | 9.9 |

Whereas the surface characteristics of the carbon substrates treated in accordance with the present invention are difficult to concretely define with respect to the carbon substrates per se, the same is not true with regard to the mechanical properties attributed to composite articles wherein the treated carbon substrates are utilized as reinforcing means. It is the purpose of the foregoing examples to illustrate the improved and advantageous properties of composite articles produced in accordance with the present invention.

It may be noted initially from the comparative tests that composites prepared utilizing fibers which have undergone electrolytic treatment only in the position of an anode lead to rather diverse results. On the other hand, the measurements obtained from composite articles prepared with fibers which have undergone the two-stage electrolytic treatment in accordance with the invention do not evidence such fluctuating results. Accordingly, it may be concluded that the fiber surface has become more homogeneous after the second stage of treatment.

The results illustrated in Table II are interesting from two different standpoints. First, the results illustrate the effect of the two-stage electrolytic treatment on the mechanical properties of the composite where the percentage of reinforcing fiber content is held constant. For example, where the proportion of fibers constitutes 80%, the bending strength changes from a value of 90 in the case where the carbon fibers have been treated only as an anode, to a value of 103 for the composite made from carbon fibers which have been subjected to the two-stage electrolytic treatment. At the same level of carbon fibers, the shearing strength increases from a value of about 8.3 to a value of 9.5. Therefore, a gain of approximately 15% in both of these properties is achieved.

Secondly, the data in Table II illustrates that it is possible in accordance with the present invention to produce excellent composites which contain a proportion of fibers appreciably higher than can be achieved where the fibers have undergone no treatment or only a single treatment as an anode. This is illustrated with reference to a composite containing 82% by weight of carbon fibers. The Composite K wherein the fibers have undergone treatment only as an anode is heterogeneous and does not exhibit any noticeable mechanical properties. The amount of fibers is simply too high. In contradistinction thereto, these disadvantages are completely absent from the Composite L wherein the fibers have undergone a two-stage treatment.

EXAMPLE 7

In an electrolysis vessel containing an aqueous solution having a concentration of 50 grams per liter of sodium chloride and 2.5 grams per liter of caustic soda, a plate of glassy carbon (this is carbon obtained by carbonization and subsequent thermal treatment of carbonaceous materials with strong transversal molecular bonds, particularly phenolic resins) of 40 × 20 millimeters in size is connected in the position of an anode and an iron electrode is connected in the position of a cathode. The distance between the electrodes is 50 millimeters. The apparatus is then connected to a voltage source having a potential difference of 9.2 volts and the cell is operated at a current of 2.75 amperes which produces a current density of 0.23 ampere per square centimeter. In the first stage, the process of electrolysis is conducted for a given period of time A whereupon the current is reversed and the process of electrolysis is conducted in the reverse position for a given period of time B. The table below illustrates the various values for times A and B. When glassy carbon is employed, the current density is typically slightly higher and ranges between about 0.1 and 1 ampere per square centimeter.

A reinforced composite is prepared by coating both sides of the treated carbon plate with an epoxy resin based on diepoxide Bisphenol-A cured by diethylenetriamine to form a laminated structure. The size of the sample being such that bending tests cannot be conducted with respect thereto, tensile strength tests are instead conducted with an Instron type TTBM type testing machine utilizing a tensile extension rate of 1 millimeter per minute at a temperature of 20°C. The following table gives the results of the various tests which have been conducted.

TABLE III

| Time of the First Stage of Electrolysis | Time of the Second Stage of Electrolysis | Tensile Strength of the Composite in $kg/cm^2$ |
| --- | --- | --- |
| 6 minutes | 2 minutes | 220 |
| 10 minutes | 3 minutes | 220 |
| 10 minutes | 10 minutes | 220 |

It is noted during the testing that the tensile strength is a function of the cohesiveness of the glassy carbon, that is, no breaking occurs at the interface between the epoxy resin matrix and the carbon, but instead occurs within the structure of the carbon plate itself.

While there have been described and pointed out the fundamental novel features of the invention as applied to the preferred embodiment, those skilled in the art will appreciate that various modifications, changes and omissions in the two-stage electrolytic treatment of carbon substrates illustrated and described herein can be made without departing from the spirit of the invention. It is the intention, therefore, to be limited only by the scope of the following claims.

What is claimed is:

1. A process for producing a reinforced composite article comprising at least one carbon reinforcing element contiguous to and firmly bonded to a matrix of resin binder material, which process comprises:
 a. pre-treating the surface of said carbon reinforcing element to improve its bonding properties in said carbon-resin binder matrix, which pre-treatment comprises (1) subjecting the surface of said carbon reinforcing element, as the anode, to electrolysis in an aqueous electrolyte whereby said surface is oxidized to form powdered carbon thereon without substantial degradation thereof and (2) thereafter subjecting the oxidized surface, as a cathode, to electrolysis in an aqueous electrolyte whereby the powdered carbon formed on said surface by the oxidation in (1) is removed;
 b. contacting said pre-treated reinforcing element with said resin binder material; and
 c. forming said composite into the desired shape.

2. The method as defined by claim 1, wherein the electric current source used in said electrolysis is a direct current source and wherein said anode and cathode treatment is performed by switching.

3. The method as defined by claim 2, wherein the carbon reinforcing element is first subjected to said electrolysis as an anode for a period of from about 1 to 10 minutes and is subsequently subjected to said electrolysis as a cathode for a period of from about 15 seconds to 10 minutes.

4. The method as defined by claim 1, wherein the electric current source used in said electrolysis is an alternating current source.

5. The method as defined by claim 4, wherein the carbon reinforcing element is subjected to said pre-treatment for a period of from about 1 to 20 minutes.

6. The method as defined by claim 1, wherein said pre-treatment (a) is conducted on a continuous basis.

7. The method as defined by claim 1, wherein said carbon reinforcing element is in the form of a fiber, filament, fibril, film, ribbon, sheet or plate.

8. A reinforced composite article comprising at least one carbon reinforcing element contiguous to and firmly bonded to a matrix of resin binder material, said article being produced by the process of claim 1.

9. The reinforced composite article as defined by claim 8, wherein said resin binder material is a thermosetting synthetic resin.

10. The reinforced composite article as defined by claim 9, wherein said reinforcing element comprises a plurality of carbon fibers.

* * * * *